United States Patent Office 3,316,198
Patented Apr. 25, 1967

3,316,198
BLENDS OF VINYL ACETATE HOMOPOLYMERS AND VINYL ACETATE COPOLYMERS
Norman A. Van Gorder, Scotch Plains, and Gerard James Giuliano, Chatham, N.J., assignors to Celanese Corporation, a corporation of Delaware
No Drawing. Filed May 17, 1963, Ser. No. 281,352
7 Claims. (Cl. 260—29.6)

This invention relates broadly to a dispersion of a polymeric material and to an unobvious use thereof. More particularly, this invention relates to the construction of a photographic film that is especially adapted for development by the amateur photographer.

In certain photographic developing and printing units that are now commercially available, the development is done by a diffusion process that is based on the use of paper and does not produce a negative. In connection with these units, it has long been desirable to use a photographic film base, e.g., cellulose acetate, and which would provide a negative for further use. To obtain this result it is necessary that the photographic film be provided with a combination antihalation layer and opaque backing that can be stripped at will, as well as have other required properties. The present invention is based on the discovery of a dispersion of polymeric material that can be converted into an opaque, strippable backing for a photographic film and which makes possible the production of the photographic film described above.

The invention will be understood most readily from the following detailed description thereof:

Photographic film generally comprises a photographic film base on one face of which there is an adhering layer or layers of any conventional photographic sensitized composition and of any conventional thickness. On the opposite side of the film base there is an adhering non-curl (anti-curl) layer, e.g., of gelatin, which imparts substantially permanent non-curling characteristics to the film construction or assembly. Over the non-curl layer and detachably united thereto is the opaque backing of this invention.

The film base can be formed of any of the materials known to be useful for this purpose, among which may be mentioned cellulose acetate, polyesters, polyolefins including polypropylene, copolymers of ethylene and propylene, etc., and others that are in commercial use or have been found experimentally to be suitable for use as a photographic film base. The film base can be of any suitable thickness. For instance, it can be between about 2 mils and 5 mils in thickness. Good results have been obtained with a cellulose acetate film, more particularly such a film that was 3.4 mils in thickness.

The non-curl layer can be formed of, for example, gelatin or any of its obvious equivalents now known in the photographic art, including synthetic polymeric gel or gel-like materials. The non-curl layer can be of any suitable thickness, e.g., about 0.1 mil to about 0.4 mil in thickness, more particularly about 0.2 mil thick.

The opaque film backing of this invention comprises a polymeric composition, which must have the following unique combination of properties:

(1) Opacity to light.
(2) Flexibility.
(3) Adhesion.
(4) Readily strippable, e.g., by hand.
(5) Non-blocking.
(6) Resistance to mild aqueous alkalinity.
(7) Freedom from pinholes.
(8) Capable of being printed.

These requirements are believed to be self-explanatory for the most part. However, the following additional comments may be helpful.

Flexibility is necessary so that the film can be wound on and unwound from film spools without cracking or otherwise damaging the backing. Adhesion is necessary so that the backing will adhere to the non-curl layer. Non-blocking is necessary so that, when the film is rolled on a spool, the backing will not adhere to the light-sensitive face of the film. Ready strippability, as by pulling with the hand, is necessary for ease in preparing the film for printing of positives after development to yield the negatives. Resistance to mild aqueous alkalinity is necessary since the entire composite shown in the drawing is immersed in an alkaline developing bath. Consequently, the backing should have good toughness and relatively good adhesion. Freedom from pinholes is necessary so that the sensitized layer or the exposed film will not be damaged by light. The backing should be capable of being printed so that the frame numbers and other indicia can be printed on the film roll.

In accordance with one aspect of the present invention a backing coating meeting the aforementioned requirements is obtained upon drying in situ a composition comprising a blend of (1) an aqueous dispersion of the homopolymer formed by the emulsion polymerization of a vinyl ester, (2) an aqueous dispersion of the interpolymer formed by the emulsion copolymerization of (a) a vinyl ester and (b) at least one alkyl acrylate, and (3) an aqueous dispersion of carbon black or similarly effective pigment or pigments. The solid ingredients of (1), (2) and (3) are present in the aforesaid blend in the proportions, by weight of about 95 to 40 parts of the homopolymeric vinyl ester dispersion of (1), about 5 to 60 parts of the vinyl ester-alkyl acrylate dispersion of (2), and about 2 to 10 parts of the dispersion pigment dispersion of (3).

More specifically, the vinyl ester is preferably vinyl-acetate and the acrylate is one or more lower acrylates, e.g., ethyl, butyl or 2-ethyl-hexyl.

It was quite surprising and unobvious that the aforementioned blend would yield a backing coating having the required combination of properties described above, since this unique combination of characteristics in no way could have been predicted from the known properties of the individual components of the blend.

In order that those skilled in the art may better understand how the present invention can be carried into effect, the following examples are given by way of illustration and not by way of limitation. All parts and percentages are by weight unless otherwise stated.

*Example 1*

| | Parts by Weight | |
|---|---|---|
| | Dispersion | Solids |
| An aqueous dispersion (about 55% solids) of emulsion formed homopolymeric vinyl acetate. | 50 | ¹ 27.5 |
| An aqueous dispersion (about 46% solids) of an emulsion formed interpolymer of about 20% vinyl acetate and about 80% 2-ethyl-hexyl acrylate | 50 | ¹ 23.0 |
| Black pigment aqueous dispersion (about 35% solids) | 10 | ¹ 3.5 |

¹ About.

The above ingredients are mixed together, e.g., at ambient temperature, until a substantially homogeneous blend is obtained. The resulting blend is cast on a gelatin-backed film of cellulose acetate and dried for 4 hours at room conditions (73° F., 50% relative humidity). The dried, thusly coated film (about 5 mils thick) shows no tack, no cracking when bent about a film spool, no light transmission, and is peelable from the gelatin layer on the cellulose acetate film.

*Example 2*

Example 1 is repeated exactly with the exceptions that, instead of 50 parts of each aqueous dispersion employed in that example, there are used 80 parts of the dispersion of homopolymeric vinyl acetate and 20 parts of the dispersion of interpolymer. The dried film is slightly more readily peelable from the gelatin layer than is the corresponding dried film of Example 1.

The acrylate used in making the interpolymer component of the dispersion employed in Examples 1 and 2 can be replaced by butyl acrylate.

It will be understood, of course, by those skilled in the art that the present invention is not limited to the use of the specific ingredients and in the specific proportions given in the foregoing examples by way of illustration. For instance, instead of the particular interpolymer or copolymer employed in the examples, there can be used a copolymer of (1) vinyl acetate and (2) at least one acrylate of the group consisting of ethyl acrylate, butyl acrylate and 2-ethylhexyl acrylate, which copolymer is formed by emulsion polymerization of the mixed monomers in other proportions within the range of from about 1 to 30 mole percent of the vinyl acetate of (1) to from about 70 to 99 mole percent of the acrylate of (2). Emulsions or dispersions of different solids content also can be employed as desired or as conditions may require. Thus, the solids content of the homopolymeric vinyl acetate dispersion and of the interpolymer dispersion may vary, for example, from about 30% to about 60% by weight of the respective dispersion; and that of the dispersion or emulsion of carbon black or other pigment from about 10% to about 40% of the dispersion.

In addition to their use in the construction of photographic films, more particularly as a plastic backcoating, the blended dispersions of this invention can be employed in forming peelable or strippable coatings on a wide variety of other substrates, e.g., metals including stainless and other steels, aluminum, copper, brass, nickel, glass, wood, paper and other natural cellulosic materials, solid synthetic resins including urea, melamine, phenolic and other types, and various other substrates.

Instead of carbon black, substantially any other opacifying agent can be used, e.g., lithopone, calcium carbonate, titanium dioxide or mixtures of these.

When the blend of dispersed polymers of this invention is to be used as a coating upon other substrates, examples of which have been given hereinbefore, the opacifying agent may be omitted or included as desired or as conditions may require. Dyes and other additives or effecting agents may be incorporated into the emulsion or dispersion blend or into the plastic coating resulting therefrom as desired or as conditions may require.

It is to be understood that the foregoing detailed description is given merely by way of illustration and that many variations may be made therein without departing from the spirit of our invention.

The embodiments of the invention in which an exclusive property or privilege is claimed are defined as follows:

1. An opaque film backing capable of being removably adhered to a photographic film base through a non-curl layer; said opaque film backing comprising a blend of (1) a homopolymer of a vinyl acetate, (2) an interpolymer of a vinyl acetate and at least one lower alkyl acrylate selected from the group consisting of ethyl acrylate, butyl acrylate and 2-ethylhexyl acrylate, and (3) an opacifying agent selected from the group consisting of carbon black, lithopone, calcium carbonate and titanium dioxide.

2. An opaque film backing as in claim 1 wherein said opaque film backing consists of about 95 to 40 parts by weight of vinyl acetate homopolymer, 5 to 60 parts by weight of an interpolymer of vinyl acetate and at least one alkyl acrylate selected from the group consisting of ethyl acrylate, butyl acrylate and 2-ethylhexyl acrylate and 2 to 10 parts by weight of an opacifying agent of claim 1.

3. An opaque film backing of claim 1 wherein the opacifying agent is carbon black.

4. An opaque film backing of claim 1 wherein said alkyl acrylate is 2-ethylhexyl acrylate.

5. A substrate having thereon a coating of plastic material obtained by drying in situ a blend of (1) an aqueous dispersion of polyvinyl acetate and (2) an aqueous dispersion of an interpolymer of vinyl acetate and a lower alkyl acrylate selected from the group consisting of ethyl acrylate, butyl acrylate and 2-ethylhexyl acrylate where said polymers were emulsion polymerized.

6. An aqueous dispersion of a mixture of a vinyl acetate homopolyer; an interpolymer consisting of vinyl acetate and a lower alkyl acrylate selected from the group consisting of ethyl acrylate, butyl acrylate and 2-ethylhexyl acrylate; and an opacifying agent selected from the group consisting of carbon black, lithopone, calcium carbonate and titanium dioxide.

7. The dispersion claimed in claim 6 containing about 95 to 40 parts by weight of said homopolymer, about 5 to 60 parts by weight of said interpolymer and about 2 to 10 parts by weight of said opacifying agent.

References Cited by the Examiner

UNITED STATES PATENTS

| | | | |
|---|---|---|---|
| 2,544,237 | 3/1951 | Reese | 98—83 |
| 2,974,114 | 3/1961 | Steckler et al. | 260—29.6 |
| 2,978,372 | 4/1961 | Bergstedt et al. | 260—901 |
| 3,014,004 | 12/1961 | Meier | 260—29.6 |
| 3,043,695 | 7/1962 | Alles | 96—83 |
| 3,083,172 | 3/1963 | Scott et al. | 260—29.6 |

WILLIAM H. SHORT, *Primary Examiner.*

NORMAN G. TORCHIN, JAMES A. SEIDLECK, J. T. BROWN, J. NORRIS, *Assistant Examiners.*